Oct. 27, 1964  J. C. WILMOT  3,154,168
AUTOMOBILE ENGINE TIME DELAY STOP SAFETY CONTROL
Filed June 10, 1963
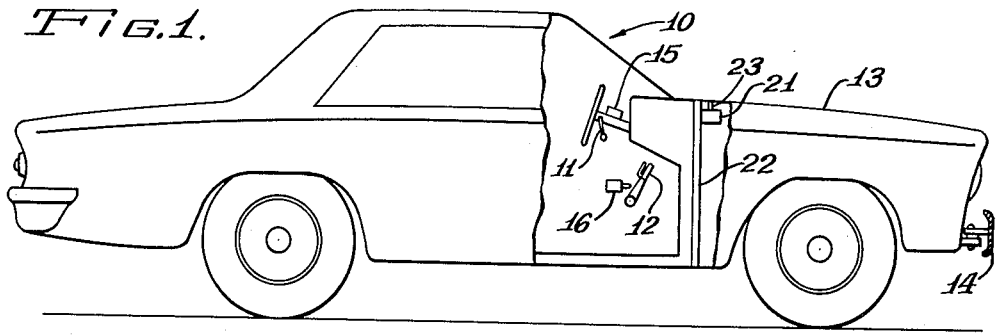
Fig. 1.
Fig. 2.
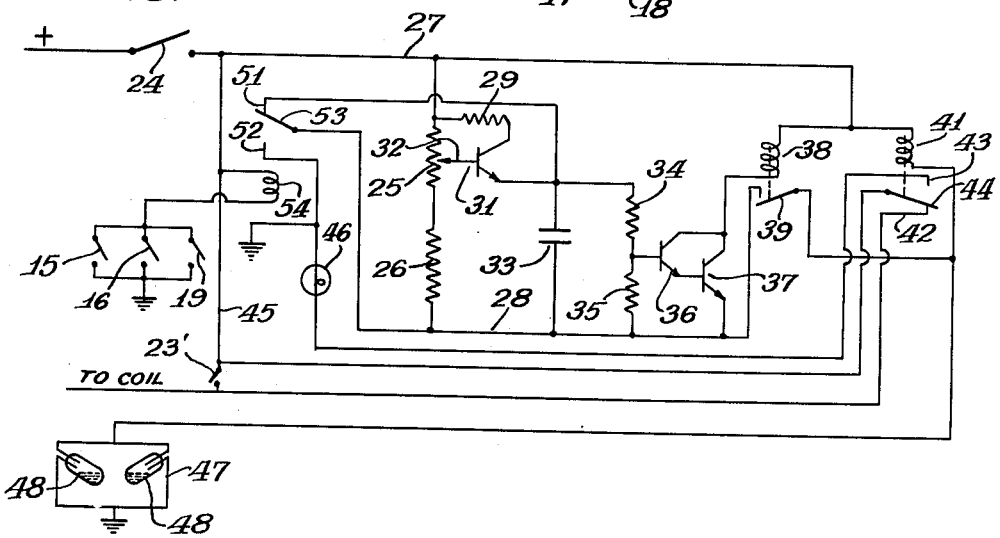
Fig. 3.
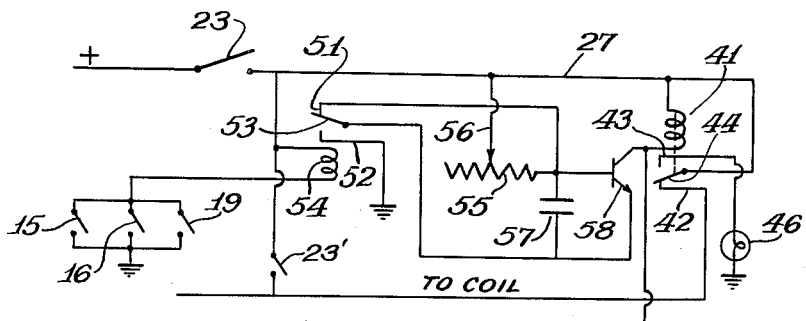
Fig. 4.
Inventor:
John C. Wilmot
By Blair, Freeman & Molinare
Attys.

United States Patent Office

3,154,168
Patented Oct. 27, 1964

3,154,168
AUTOMOBILE ENGINE TIME DELAY STOP
SAFETY CONTROL
John C. Wilmot, Apt. 1, 701 Valencia Ave.,
Coral Gables, Fla.
Filed June 10, 1963, Ser. No. 286,752
6 Claims. (Cl. 180—82)

This invention relates to an automobile safety control and more particularly to a control system for stopping the engine of an automobile if it remains parked for a predetermined period of time or is turned over.

There are many cases of accidental carbon monoxide poisoning resulting from continued operation of an automobile engine when the automobile is stopped either on the street or in a garage for an extended period of time with the engine running. To eliminate this, it has been heretofore proposed to utilize a clock mechanism to shut off the engine after the automobile has remained stationary for a predetermined time. These mechanisms, as heretofore constructed, have been so complex and expensive that they have not been used to any appreciable extent. They are furthermore subject to certain difficulties in restarting the engine and in providing the necessary degree of reliability.

It is accordingly one of the objects of the present invention to provide an automobile safety control which is relatively simple and inexpensive to construct and install and which functions with a high degree of reliability to stop the automobile engine after the automobile has been parked for a predetermined time interval.

According to a feature of the invention, all of the parts are electrical so that no moving parts are involved with the exception of relay operated switches so that the entire device can be made of small size for easy installation and for complete reliability and accuracy of operation.

Still another object is to provide an automobile safety control including a relay operated switch to stop the engine which is energized either when the automobile is parked for a predetermined time interval or in the event the automobile should be turned over or tilted excessively.

According to a further feature of the invention, the safety control is disabled when the hood of the automobile is opened so that the engine can be worked on without being stopped.

The above and other objects and features of the invention will be more readily apparent from the following description when read in connection with the accompanying drawing, in which:

FIG. 1 is a side elevation of an automobile with parts broken away to show installation of the safety control thereon;

FIG. 2 is a partial section illustrating a bumper mounting and switch operation; and FIGS. 3 and 4 are circuit diagrams of alternative circuits according to the invention.

As shown in FIG. 1, the safety control of the invention is applied to any conventional automobile, as indicated generally at 10, provided with a transmission control or shift lever 11 and a parking brake 12. The automobile has a hinged hood 13 which can be swung open to expose the engine and is provided with a front bumper 14 projecting beyond the front of the automobile body and secured thereon. While many of the details in conventional automobiles or trucks may differ from those illustrated diagrammatically in FIG. 1, all conventional motor vehicles incorporate the same basic elements and the invention is equally applicable to all such vehicles regardless of the exact details of construction thereof.

According to the present invention, the engine of the automobile is adapted to be stopped after a predetermined period of time whenever the shift lever 11 is moved to a parked position, whenever the parking brake 12 is moved to engaged position, or whenever a predetermined pressure is maintained on the front bumper 14 as, for example, due to running the automobile against the end wall of a garage. For this purpose, a switch 15 is provided adjacent to the gear shift lever to be engaged and closed by it whenever the gear shift lever is moved to a neutral or park position and regardless of whether the transmission is of the automatic or manual type. A similar switch 16 is mounted adjacent to the parking brake lever 12 to be engaged and closed by it whenever the parking brake is moved to engaged position. The front bumper 14, as best seen in FIG. 2, is mounted on a support 17 through a resilient mounting such as a rubber block 18 so that it can move rearwardly when a predetermined pressure is applied thereto. A switch 19 mounted adjacent to the bumper is adapted to be closed whenever the bumper is moved rearwardly a predetermined relatively small amount.

The safety control of the invention is preferably housed in a relatively small casing, as shown at 21, which may be mounted at any convenient position on the vehicle. As shown, the casing 21 is mounted on the usual firewall 22 within the engine compartment and is provided with a switch operator 23 which is engaged by the hood of the vehicle when it is in closed position to be held open thereby. When the hood of the vehicle is raised for working on the engine, the switch operator 23 will be released so that the switch 23', as shown in FIGS. 3 and 4, will close.

The safety control comprises a circuit which may take the form shown in either FIG. 3 or FIG. 4, FIG. 4 being a somewhat simplified version of the circuit shown in FIG. 3. Referring first to FIG. 3 the circuit is powered through the usual ignition switch, indicated at 24, so that it is operative only when the ignition switch is closed. The ignition switch as is customary is connected to one side of a battery, as indicated by the plus mark adjacent to the switch, with the other side of the battery being grounded. The circuit itself comprises essentially a time delay circuit including a pair of resistors 25 and 26 connected between the hot line 27 from the ignition switch and a line 28. A resistor 29 also connected to the hot line 27 leads to one electrode of a transistor 31 whose control electrode is connected to a wiper 32 movable over the resistor 25 to adjust the effective time interval. The output electrode of the transistor 31 is connected to one side of a capacitor 33 whose other side is connected to the line 28 and also to a pair of resistors 34 and 35 in series which parallel the capacitor 33. The midpoint between resistors 34 and 35 is connected to the control electrode of a transistor 36 whose output is applied to the control electrode of a transistor 37 to amplify the power supplied by the time delay circuit. The transistor 37 is connected between the line 28 and one side of a relay coil 38 whose other side is connected to the hot line 27. The relay coil 38 actuates a power supply switch 39 which when closed establishes a connection between the line 28 and one side of a second relay coil 41 whose other side is connected to the hot line 27.

The relay coil 41 operates a two-pole switch having a normally engaged contact 42 and a normally open contact 43 adapted to be engaged by movable contact 44. The movable contact 44 is connected through a line 45 to the hot line 27 and the contact 42 is connected to the ignition coil, as indicated, so that normally the ignition coil will be energized to run the engine when the switch 24 is closed. When the coil 41 is energized to complete a circuit between the contacts 43 and 44, supply of power to the ignition coil will be interrupted and a signal light 46 will be energized to indicate that the safety control has functioned.

The coil 41 may also be energized directly through a tilt switch assembly 47 which is connected between ground and the side of coil 41 remote from the hot line 27. As shown, the tilt switch assembly comprises two mercury switches 48 set at opposite angles of approximately 45° and positioned with both contacts at their upper ends so that they are normally open. When the vehicle is tilted excessively or is turned over, one or the other of the switches 48 will close to energize the coil 41 and interrupt the ignition circuit so that the automobile engine will be stopped immediately.

In the normal condition, the capacitor 33 is discharged through a two-position switch having an upper normally closed contact 51, a lower normally open contact 52 and a movable contact 53. Normally the contact 53 engages the contact 51, as shown, to short-circuit the capacitor 33 so that it is discharged and so that no voltage is applied to the control electrode of the transistor 36 which is then non-conducting. The switch contact 53 is adapted to be moved by a relay coil 54 connected between the hot line 27 and ground through the switches 15, 16 and 19 in parallel. The contact 52 of the switch is connected to ground, as shown.

Whenever any of the switches 15, 16 or 19 is closed by movement of the transmission shift lever or the parking brake to its parked position, or by pressure on the front bumper 14, the coil 54 will be energized to move the contact 53 into engagement with the contact 52 and out of engagement with the contact 51. At this time, the time delay circuit is connected between the hot line 27 and ground so that the transistor 31 will be made conductive and the capacitor 33 will start to charge. The rate at which this occurs may be varied by adjusting the wiper 32, but in any event when the capacitor reaches a predetermined charge a signal will be supplied to the transistor 36 to make it conductive. This in turn will energize the coil 38 through the transistor 37 and to ground through switch contacts 52 and 53 to close the switch 39. Closing of this switch will energize the coil 41 from the hot line 27 through the switch 39, lead 28 and switch contacts 52 and 53 to ground. Supply of power to the engine coil will therefore be interrupted and the engine will be stopped. To restart the engine, it is necessary only to open the ignition switch momentarily thereby de-energizing the relay coil 54 and establishing the circuit through the contacts 51 and 53 to discharge the capacitor 33. Upon reclosing the ignition switch 24 and unless the switches 15, 16 and 19 are all open the timing cycle will start again to stop the engine after a predetermined time interval. However, in the event the engine has been stopped due to an excessively long wait in traffic, it can be restarted immediately so that the automobile can move with the traffic when permissible.

The switch 23', as shown, is connected directly between the line 45 and the connection to the engine coil so that whenever it is closed by opening of the automobile hood, the engine can continue to run regardless of the condition of the time delay circuit.

FIG. 4 illustrates a somewhat simplified version of the circuit of FIG. 3 in which parts identical to corresponding parts in FIG. 3 are indicated by the same reference numerals. In this construction, the relay coil 54 and its several contacts are identical to those shown in FIG. 3 and the coil is energized through the switches 15, 16 or 19 in precisely the same manner. The time delay circuit has, however, been substantially simplified to comprise a resistor 55 engaged by a wiper 56 which is connected to the hot line and which is adjustable to vary the time interval. The resistor 55 is connected through capacitor 57 to the switch blade 53 and the common point between the resistor and capacitor is connected to the control electrode of a transistor 58. The coil 41 is connected at one end to the hot line and at its other end through transistor 58 to the switch blade 53.

This construction functions in the same manner as that of FIG. 3 with closing of the circuit between switch contact 51 and 53 short-circuiting the capacitor 57 to discharge it and closing of the circuit between switch contacts 52 and 53 connecting the lower end of the capacitor 57 and the output electrode of the transistor 58 to ground. When this occurs, the capacitor 57 will start to charge and after a predetermined time interval will supply a signal to the transistor 58 sufficient to make it conductive so that the relay coil 41 will be energized. Upon temporary opening of the ignition switch 23 the capacitor will be discharged immediately so that the engine can be immediately restarted after a stop.

While two embodiments of the invention have been shown and described herein, it will be understood that they are illustrative only and not to be taken as a definition of the scope of the invention, reference being had for this purpose to the appended claims.

What is claimed is:

1. In an automobile having an engine, an ignition switch controlling the engine, and controls movable to driving or parked positions, a safety control comprising a time delay circuit including a resistor and a capacitor, a switch normally short-circuiting the time delay circuit, a coil operating the short circuiting switch and connected to a source of power through the ignition switch, control switches actuated by movement of the controls to parked position to energize the coil when the ignition switch is closed, a power supply switch controlling operation of the engine, operating means to operate the power supply switch, and means operated by the time delay circuit a predetermined time after the short circuiting switch is operated to energize the operating means, momentary opening of the ignition switch deenergizing the coil and causing the short circuiting switch to short circuit and discharge the time delay circuit for conditioning the engine for immediate restarting.

2. The construction of claim 1 in which the automobile includes a hood and a switch closed by the hood when the hood is open shunting the power supply switch whereby the engine is operative when the hood is open.

3. In an automobile having an engine, a transmission, an ignition switch for the engine, a shift control for the transmission movable to driving and parked position, a parking brake control, and a bumper mounted for movement in response to a predetermined pressure, a safety control comprising a normally de-energized electric time delay circuit, a switch normally short circuiting the time delay circuit, actuating means for the short circuiting switch energized through the ignition switch, normally open control switches for the actuating means closed when the shift control is in its parked position, the parking brake control is in its brake engaging position or the bumper is in its moved position, a power supply switch controlling operation of the engine, power supply actuating means for the second switch, and means operated by the time delay means to energize the second actuating means a predetermined time after the short circuiting switch is operated, momentary opening of the ignition switch de-energizing the actuating means and causing the short circuiting switch to short circuit and discharge the time delay circuit for conditioning the engine for immediate restarting.

4. The construction of claim 3 in which the automobile includes a hood, a switch closed by the hood when the hood is open shunting the second switch.

5. An automobile safety control comprising an electrical time delay circuit including a resistor and a capacitor, a two-position switch having a normal position in which it short-circuits the time delay circuit and an actuated position in which it connects one side of the time delay circuit to one side of a source of power, actuating means for the switch adapted to be controlled by control devices for the vehicle, means including a control switch for the vehicle to connect the other side of the time delay circuit to the other side of the source of power, a second switch adapted to control operation of the vehicle, actuating means for the second switch, and means responsive to voltage across the capacitor to energize the second actuating means.

6. The construction of claim 5 including a normally open switch shunting the second switch and adapted to be closed by opening of the hood of an automobile equipped with the safety control.

References Cited by the Examiner

UNITED STATES PATENTS

| | | | |
|---|---|---|---|
| 1,442,311 | 1/23 | Watson. | |
| 1,823,950 | 9/31 | Mechetti | 180—83 |
| 1,996,528 | 4/35 | Smith | 180—83 |
| 2,304,608 | 12/42 | Smythe | 307—10 |
| 2,576,017 | 11/51 | Jeffrey et al. | 340—282 |
| 2,606,626 | 8/52 | Meyer | 180—82 |
| 2,611,011 | 9/52 | Feigal | 307—141 X |
| 2,782,276 | 2/57 | Woods | 200—61.47 |

A. HARRY LEVY, *Primary Examiner.*